United States Patent
Alvarez

(10) Patent No.: US 12,161,084 B2
(45) Date of Patent: Dec. 10, 2024

(54) AUTOMATIC PET FLUSH TOILET

(71) Applicant: Robin Briano Alvarez, Chula Vista, CA (US)

(72) Inventor: Robin Briano Alvarez, Chula Vista, CA (US)

( * ) Notice: Subject to any disclaimer, the term of this patent is extended or adjusted under 35 U.S.C. 154(b) by 84 days.

(21) Appl. No.: 18/114,242

(22) Filed: Feb. 25, 2023

(65) Prior Publication Data
US 2024/0284866 A1  Aug. 29, 2024

(51) Int. Cl.
*A01K 1/01* (2006.01)

(52) U.S. Cl.
CPC .................................... *A01K 1/011* (2013.01)

(58) Field of Classification Search
CPC .............................. A01K 1/011; A01K 23/005
See application file for complete search history.

(56) References Cited

U.S. PATENT DOCUMENTS

| | | | |
|---|---|---|---|
| 4,117,555 A * | 10/1978 | Dennis ................... | A01K 1/011 119/163 |
| 5,027,451 A | 7/1991 | Wooten | |
| 8,196,547 B2 * | 6/2012 | Liu ....................... | A01K 1/0121 119/162 |
| 8,434,426 B2 | 5/2013 | Smith | |
| 10,212,915 B1 * | 2/2019 | Brown .................. | A01K 1/0152 |
| 10,537,090 B2 * | 1/2020 | Roh ........................ | F04D 13/08 |
| 10,721,917 B2 * | 7/2020 | Fernandez ............... | A01K 1/01 |
| 2009/0241849 A1 * | 10/2009 | Fournier ................ | A01K 1/011 4/300 |
| 2015/0053140 A1 | 2/2015 | Roh | |
| 2017/0245459 A1 | 8/2017 | Halliday | |
| 2018/0249671 A1 * | 9/2018 | Roh ....................... | B01D 35/02 |

OTHER PUBLICATIONS https://www.youtube.com/watch?v=2BDWLT8uX38.

* cited by examiner

*Primary Examiner* — Yvonne R Abbott-Lewis
(74) *Attorney, Agent, or Firm* — Edison Law Group

(57) ABSTRACT

A pet flush toilet having a bowl with a drain opening in a rear end of the bowl near a bottom of the bowl, a flushing opening in a side of the bowl, and a pet entrance opening in a front end of the bowl. A flushing hose is inserted into the flushing opening and a vacuum input pipe is inserted into the drain opening. The pet flush toilet has a water pump and a vacuum pump. The flushing hose is connected to the output of the water pump and the vacuum input pipe is connected to the input of the vacuum pump. A water source is connected to the input of the water pump. The water pump and the vacuum pump turn on automatically and simultaneously to flush and clean the bottom of the pet flush toilet when a motion sensor detects a pet leaving the pet flush toilet.

14 Claims, 4 Drawing Sheets

AUTOMATIC PET FLUSH TOILET

FIELD OF THE INVENTION

This disclosure relates to pet toilets and, more particularly, to automatic pet flush toilets that use pressurized flushing and drainage systems.

BACKGROUND OF THE INVENTION

Automatic pet flush toilets are known. They are particularly useful in urban areas where it may be difficult for an owner to find suitable places outside for elimination of pet fecal waste and urine. Ideally, pet fecal waste and urine is best disposed of in municipal sewer systems. U.S. Pat. No. 8,434,426 discloses an automatic pet toilet having a concave basin and central drain hole. Flushing and draining operate by gravity. The basin has a grate which is undesirable because they are difficult to clean and may retain particulate matter. U.S. Patent Application No. 2017/0245459 discloses an automatic pet toilet having a concave basin and a central drain hole. This pet toilet also flushes and drains by gravity. A concave basin may be somewhat slippery and a pet may step into the central drain hole which is undesirable. U.S. Patent Application No. 2015/0053140 discloses a device for cleaning a pet toilet. The pet toilet uses a net grating for a basin. Urine passes through the net grating into a container. Fecal material remains on the netting and is removed by hand. The container is cleaned with a water pump and but drains by gravity. Flushing and draining by gravity are relatively inefficient in removing fecal material from a basin, grating, or netting.

SUMMARY OF THE INVENTION

The pet flush toilet of this disclosure includes a bowl having a bottom, a right side, a left side, a front end, and a rear end, with a drain opening in the rear side near the bottom, a flushing opening in the left side or in the right side above the bottom, and a pet entrance opening in the front end. A flushing hose is inserted at one end into the flushing opening and a vacuum input pipe is inserted at one end into the drain opening. A water pump and a vacuum pump for the pet flush toilet each have an input and an output. A second opposite end of the vacuum input pipe is connected to the input of the vacuum pump and a water source is connected to the input of the water pump. The water pump and the vacuum pump are configured to turn on simultaneously to flush and clean the bottom of the pet flush toilet. The pet flush toilet has a base having a support stand with a water tank, a motion detector, and an electrical control module. The water source is a water tank having a flush valve and the water tank receives water from a water supply hose connected to a water faucet. The electrical control module contains timers, switches, and circuitry which operate a motion sensor, the water pump, and the vacuum pump. The motion sensor detects a pet moving into and out of the bowl. The electrical control module turns on the water pump and the vacuum pump for a specified period of time when the pet moves out of the bowl after entering the bowl. An output pipe is connected to the output of the vacuum pump and the output pipe is configured for connection to a sewer drain.

An advantage the pet flush toilet of this disclosure is an automatic flushing system that flushes the bottom of the toilet with a water pump at a desired pressure and simultaneously vacuums the bottom of the toilet for a desired period of time.

Another advantage is a motion detection system that automatically flushes and vacuums within a few seconds after the pet leaves the pet flush toilet.

Another advantage is a vacuum system that can drain the pet flush toilet to a sewer pipe.

Another advantage is a pet flush toilet that is easy to construct and maintain and is durable.

Another advantage is a pet flush toilet that is adjustable for pressure, vacuum, and duration of flushing.

Another advantage is a toilet bowl that rests almost flat at ground level on the floor, making it natural for pets to use the pet flush toilet and to walk on it.

DETAILED DESCRIPTION OF THE INVENTION

While the following description details the preferred embodiments of the present invention, it is to be understood that the invention is not limited in its application to the details of arrangement of the parts or steps of the methods illustrated in the accompanying figures, since the invention is capable of other embodiments and of being practiced in various ways.

Figure 1:
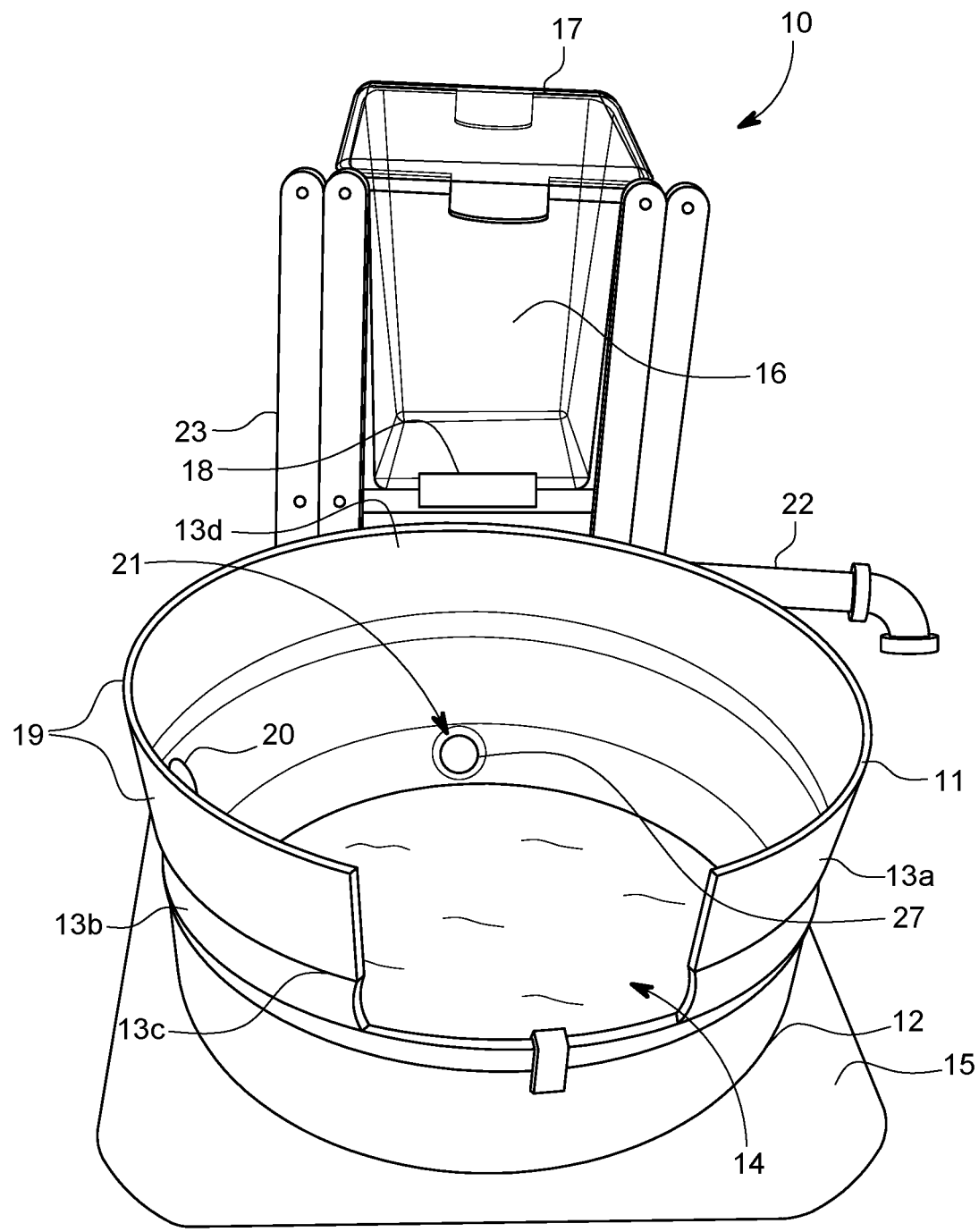
FIG. 1 is an illustration of a front perspective view of a pet flush toilet according to an exemplary embodiment of the present disclosure.

FIG. 1 is an illustration of a front perspective view of a pet flush toilet 10 according to an exemplary embodiment of the present disclosure. The pet flush toilet 10 has a bowl 11 having a bottom end 12, a right side 13A, a left side 13B, a front end 13C, and a rear end 13D. The front end 13C of the bowl 11 has an entrance opening 14 for a pet, for example a dog, to enter the bowl 11. The bowl 11 is placed on a base 15. A water tank or cistern 16 is placed at the rear end 13D of the bowl 11. The water tank 16 has a top cover 17. The water tank 16 is held in a support stand 23. A motion sensor 18 is attached to the support stand 23. One end of a flushing hose 19 is attached to the bowl 11 on the left side 13B and extends into a flushing opening 20 in a middle area of the left side 13B. The flushing hose 19 could also be attached on the right side 13A instead. A drain opening 21 is in the rear end 13D of the bowl 11 and at the bottom end 12 of the bowl 11. The drain opening 21 is connected to a vacuum elimination drainpipe 22.

Figure 2:
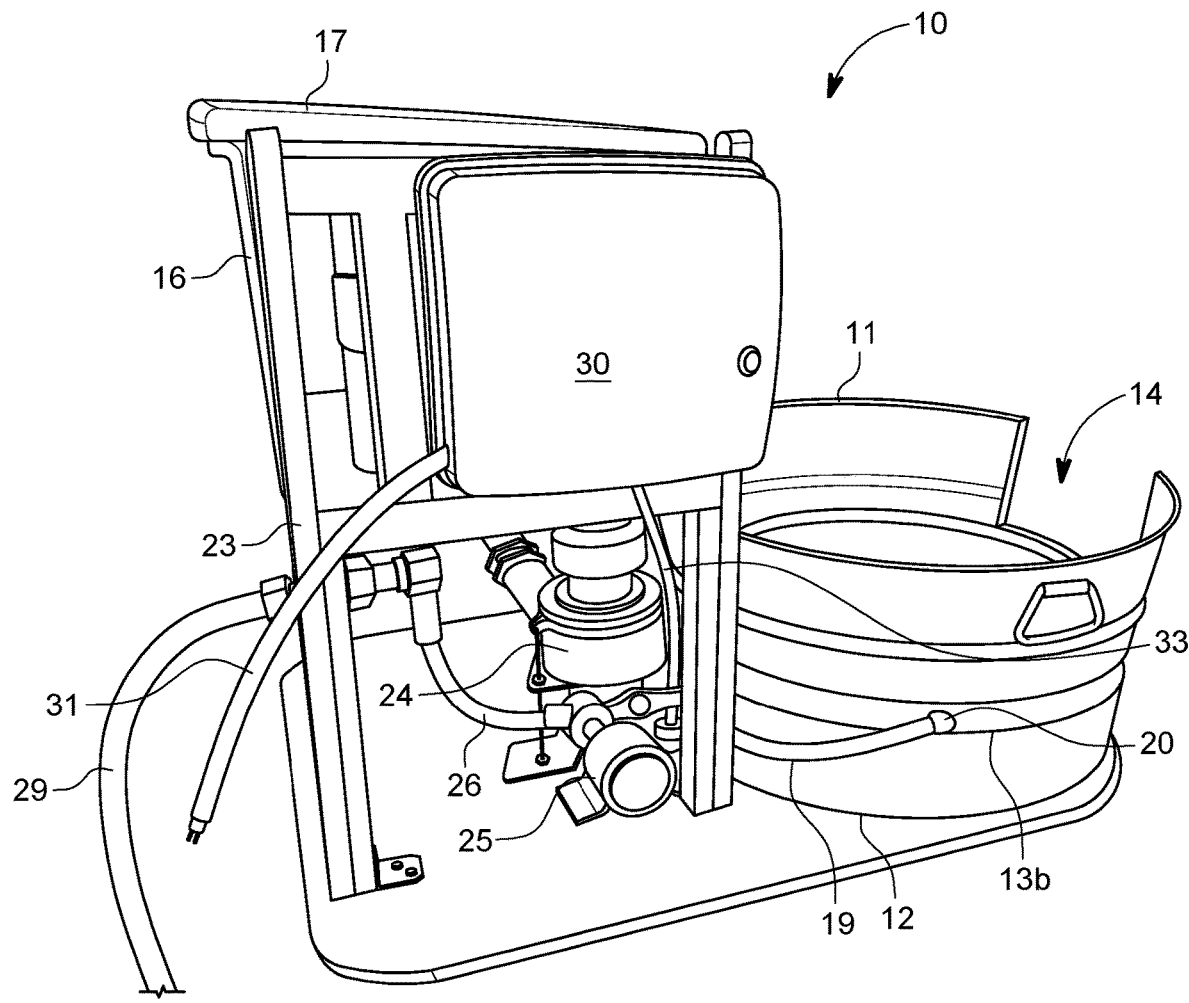
FIG. 2 is a left side perspective view of the pet flush toilet.

FIG. 2 is a left side perspective view of the pet flush toilet 10. FIG. 2 further shows a vacuum pump 24 and a water pump 25. An inlet hose 26 is attached to the inlet of the water pump 25. The flushing hose 19 is attached to the output of the water pump 25 and extends to the opening 20 in the side 13B of the bowl 11. A water supply hose 29 connected to a water faucet provides water to the pet flush toilet 10. An electrical control module 30 is attached to the support stand 23. Electrical power is provided to the electrical control module 30 with a power cord 31. The electrical control module 30 contains timers, switches, and circuitry to operate the motion sensor 18, vacuum pump 24, and water pump 25, by methods well known in the art. Electrical wires 33 connect the vacuum pump 24 and the water pump 25 to the electrical control module 30.

Figure 3:
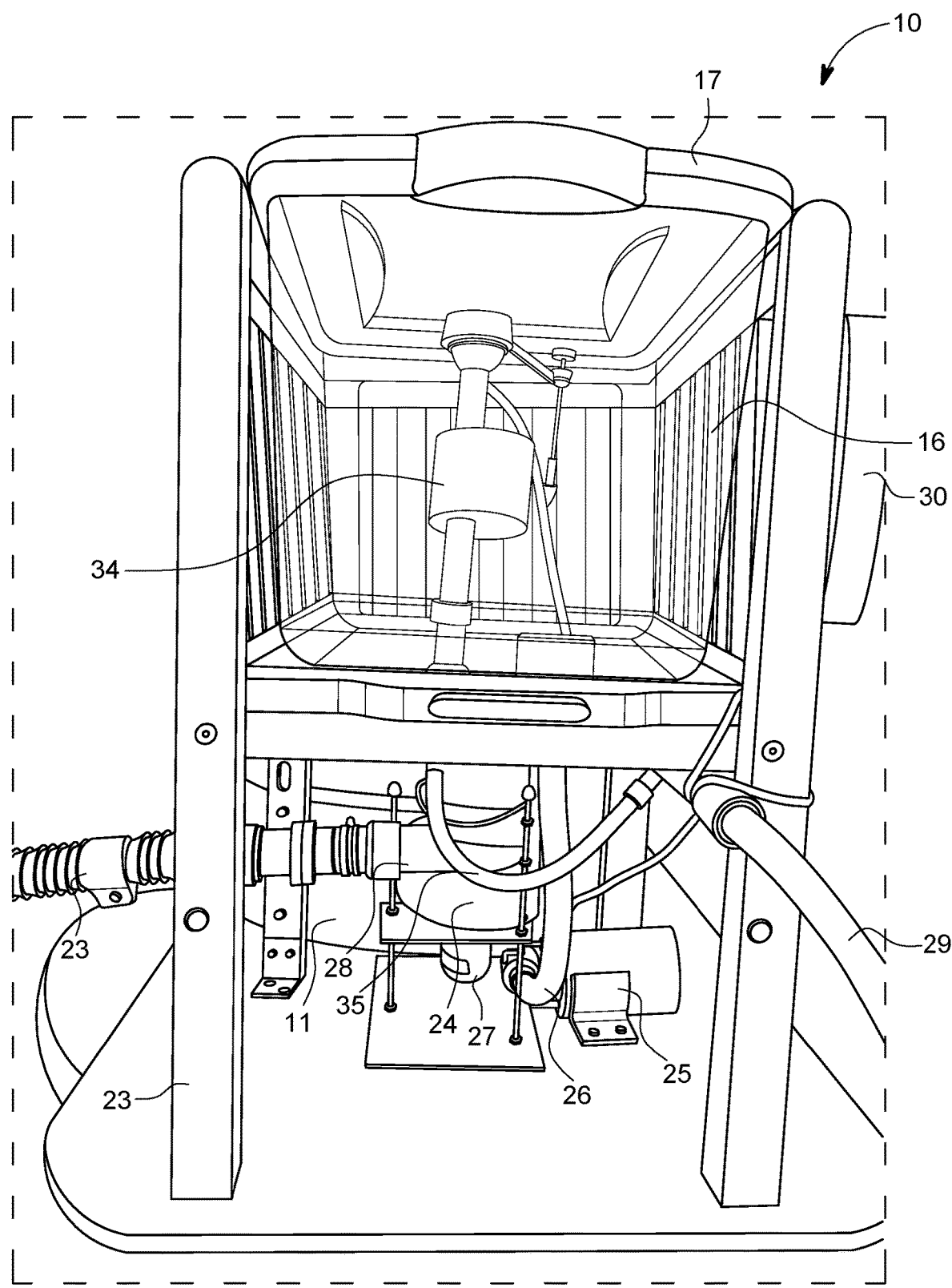
FIG. 3 is a rear perspective view of the pet flush toilet.
Figure 4:
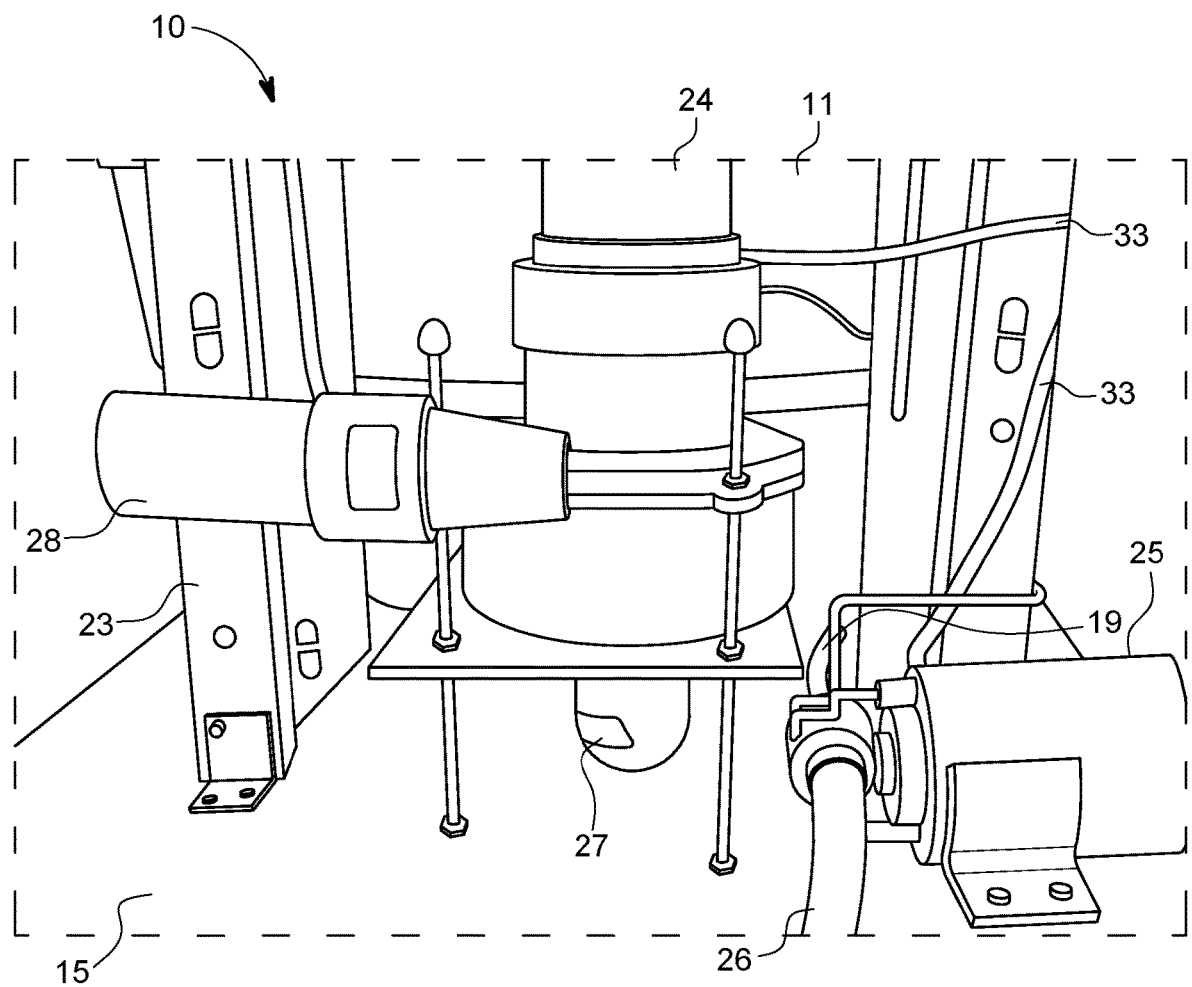
FIG. 4 is an enlarged rear perspective view of a water pump and a vacuum pump of the pet flush toilet.

FIG. 3 is a rear perspective view of the pet flush toilet 10. FIG. 3 further shows an output pipe 28 of the vacuum pump 24. The vacuum drainpipe 22 is connected to the vacuum output pipe 28. FIG. 3 also shows a flushing valve 34 in the water tank 16, a water tank input hose 35 extending from the water supply hose 29 into the water tank 16, and the inlet hose 26 for the water pump 25 extending from the water tank 16 to the water pump 25. As water is supplied to the water pump 25 from the water tank 16 through the inlet hose 26, the flushing valve 34 opens to allow the water tank 16 to be refilled by the water supply hose 29. However, the water supply hose 29 can be attached directly to the input of the water pump 25, if desired, bypassing the water tank 16. FIG. 4 is an enlarged rear perspective view of the vacuum pump 24 and the water pump 25 of the pet flush toilet 10.

In use, the pet flush toilet monitors motion with the motion detector within the area of the bowl. When a pet enters the bowl, the pet is detected by the motion detector. When the pet completes eliminating its waste and leaves the bowl, the pet's motion is detected again. Thereafter, for a selected amount of time, for example 5 to 10 seconds, the water pump and the vacuum pump are turned on by the electronics in the electrical control module for a selected amount of time, for example 5 to 30 seconds. The water pump supplies water to the flushing hose at a desired pressure and as the water enters the bowl it spreads over the entire surface of the bottom of the bowl. The vacuum pump immediately sucks the water from the bottom of the bowl through the vacuum opening and flushes it out through the vacuum elimination output pipe. The combined action of the water pump and the vacuum pump produce and improved cleansing effect on the bottom of the bowl. The vacuum elimination pipe can be directed out of doors, to a toilet, to a sewer pipe, or to a closed container. When the pumps are turned off by the electronics the electronics reset for the next flushing cycle.

The foregoing description illustrates and describes the disclosure. Additionally, the disclosure shows and describes only the preferred embodiments but, as mentioned above, it is to be understood that the preferred embodiments are capable of being formed in various other combinations, modifications, and environments and are capable of changes or modifications within the scope of the invention concepts as expressed herein, commensurate with the above teachings and/or the skill or knowledge of the relevant art. The embodiments described herein above are further intended to explain the best modes known by applicant and to enable others skilled in the art to utilize the disclosure in such, or other, embodiments and with the various modifications required by the particular applications or uses thereof. Accordingly, the description is not intended to limit the invention to the form disclosed herein. Also, it is intended that the appended claims be construed to include alternative embodiments. It will be further understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A pet flush toilet, comprising:
    a) a bowl having a bottom, a right side, a left side, a front end, and a rear end, with a drain opening in the rear end near the bottom, a flushing opening in the left side or in the right side above the bottom, and a pet entrance opening in the front end;
    b) a flushing hose inserted at a first end into the flushing opening and a vacuum input pipe inserted at a first end into the drain opening;
    c) a water pump having an input and an output and a vacuum pump having an input and an output,
    wherein a second end opposite the first end of the flushing hose is connected to the output of the water pump and
    wherein a second end opposite the first end of the vacuum input pipe is connected to the input of the vacuum pump; and
    d) a water source connected to the input of the water pump, wherein the water pump and the vacuum pump are configured to turn on simultaneously to flush and clean the bottom of the pet flush toilet.

2. The pet flush toilet of claim 1, further comprising a base having a support stand with a water tank and an electrical control module.

3. The pet flush toilet of claim 1, further comprising an electrical control module containing timers, switches, and circuitry to operate a motion sensor, the water pump, and the vacuum pump,
    wherein the motion sensor detects a pet moving into and out of the bowl and
    wherein the electrical control module turns on the water pump and the vacuum pump for a specified period of time when the pet moves out of the bowl after entering the bowl.

4. The pet flush toilet of claim 1 wherein the water source is a water tank having a flush valve, the water tank receiving water from a water supply hose connected to a water faucet.

5. The pet flush toilet of claim 1, further comprising an output pipe connected to the output of the vacuum pump, the output pipe configured for connection to a sewer drain.

6. A pet flush toilet, comprising:
    a) a bowl having a bottom, a right side, a left side, a front end, and a rear end, with a drain opening in the rear end near the bottom, a flushing opening in the left side or in the right side above the bottom, and a pet entrance opening in the front end;
    b) a flushing hose inserted at a first end into the flushing opening and a vacuum input pipe inserted at a first end into the drain opening;
    c) a water pump having an input and an output and a vacuum pump having an input and an output,
    wherein a second end opposite the first end of the flushing hose is connected to the output of the water pump and
    wherein a second end opposite first end of the vacuum input pipe is connected to the input of the vacuum pump;
    d) a water source connected to the input of the water pump, wherein the water pump and the vacuum pump are configured to turn on simultaneously to flush and clean the bottom of the pet flush toilet; and
    e) a base having a support stand with a water tank, a motion detector, and an electrical control module.

7. The pet flush toilet of claim 6, wherein the electrical control module contains timers, switches, and circuitry which operate a motion sensor, the water pump, and the vacuum pump,
    wherein the motion sensor detects a pet moving into and out of the bowl and
    wherein the electrical control module turns on the water pump and the vacuum pump for a specified period of time when the pet moves out of the bowl after entering the bowl.

8. The pet flush toilet of claim 6 wherein the water source is a water tank having a flush valve, the water tank receiving water from a water supply hose connected to a water faucet.

9. The pet flush toilet of claim 6, further comprising an output pipe connected to the output of the vacuum pump, the output pipe configured for connection to a sewer drain.

10. A pet flush toilet, comprising:
   a) a bowl having a bottom, a right side, a left side, a front end, and a rear end, with a drain opening in the rear end near the bottom, a flushing opening in the left side or in the right side above the bottom, and a pet entrance opening in the front end;
   b) a flushing hose inserted at a first end into the flushing opening and a vacuum input pipe inserted at a first end into the drain opening;
   c) a water pump having an input and an output and a vacuum pump having an input and an output,
   wherein a second end opposite the first end of the flushing hose is connected to the output of the water pump and
   wherein a second end opposite the first end of the vacuum input pipe is connected to the input of the vacuum pump;
   d) a water source connected to the input of the water pump, wherein the water pump and the vacuum pump are configured to turn on simultaneously to flush and clean the bottom of the pet flush toilet; and
   e) a base having a support stand with a water tank, a motion detector, and an electrical control module, wherein the water source is a water tank having a flush valve, the water tank receiving water from a water supply hose connected to a water faucet.

11. The pet flush toilet of claim 10, wherein the electrical control module contains timers, switches, and circuitry which operate a motion sensor, the water pump, and the vacuum pump,
   wherein the motion sensor detects a pet moving into and out of the bowl and
   wherein the electrical control module turns on the water pump and the vacuum pump for a specified period of time when the pet moves out of the bowl after entering the bowl.

12. The pet flush toilet of claim 10, further comprising an output pipe connected to the output of the vacuum pump, the output pipe configured for connection to a sewer drain.

13. A pet flush toilet, comprising:
   a) a bowl having a bottom, a right side, a left side, a front end, and a rear end, with a drain opening in the rear end near the bottom, a flushing opening in the left side or in the right side above the bottom, and a pet entrance opening in the front end;
   b) a flushing hose inserted at a first end into the flushing opening and a vacuum input pipe inserted at a first end into the drain opening;
   c) a water pump having an input and an output and a vacuum pump having an input and an output,
   wherein a second end opposite the end of the flushing hose is connected to the output of the water pump and
   wherein a second end opposite the first end of the vacuum input pipe is connected to the input of the vacuum pump;
   d) a water source connected to the input of the water pump, wherein the water pump and the vacuum pump are configured to turn on simultaneously to flush and clean the bottom of the pet flush toilet; and
   e) a base having a support stand with a water tank, a motion detector, and an electrical control module, wherein the water source is a water tank having a flush valve, the water tank receiving water from a water supply hose connected to a water faucet,
   wherein the electrical control module contains timers, switches, and circuitry which operate a motion sensor, the water pump, and the vacuum pump,
   wherein the motion sensor detects a pet moving into and out of the bowl, and
   wherein the electrical control module turns on the water pump and the vacuum pump for a specified period of time when the pet moves out of the bowl after entering the bowl.

14. The pet flush toilet of claim 13, further comprising an output pipe connected to the output of the vacuum pump, the output pipe configured for connection to a sewer drain.

* * * * *